US012686429B2

(12) United States Patent
Boyle et al.

(10) Patent No.: US 12,686,429 B2
(45) Date of Patent: Jul. 21, 2026

(54) JOGGING STROLLER

(71) Applicant: THE RADIO FLYER COMPANY, Chicago, IL (US)

(72) Inventors: Michael Boyle, Chicago, IL (US); Collin Ostergaard, Chicago, IL (US)

(73) Assignee: The Radio Flyer Company, Chicago, IL (US)

( * ) Notice: Subject to any disclaimer, the term of this patent is extended or adjusted under 35 U.S.C. 154(b) by 271 days.

(21) Appl. No.: 18/667,456

(22) Filed: May 17, 2024

(65) Prior Publication Data

US 2024/0383518 A1 Nov. 21, 2024

Related U.S. Application Data

(60) Provisional application No. 63/467,473, filed on May 18, 2023.

(51) Int. Cl.
B62B 7/04 (2006.01)
B62B 7/06 (2006.01)
B62B 9/20 (2006.01)

(52) U.S. Cl.
CPC ................ B62B 7/044 (2013.01); B62B 7/06 (2013.01); B62B 9/20 (2013.01); *B62B 2301/0463* (2013.01)

(58) Field of Classification Search
CPC .... B62B 7/04; B62B 7/06; B62B 9/20; B62B 2301/0463
See application file for complete search history.

(56) References Cited

U.S. PATENT DOCUMENTS

| | | | | |
|---|---|---|---|---|
| 6,098,993 A | * | 8/2000 | Bellinson | .................. B62B 9/20 |
| | | | | 280/47.11 |
| 11,878,730 B1 | * | 1/2024 | Musshorn | .............. A63B 23/12 |
| 2005/0140105 A1 | | 6/2005 | Hernandez | |
| 2012/0038124 A1 | * | 2/2012 | Newton, Jr. | ........... B62B 5/068 |
| | | | | 280/47.38 |
| 2014/0015207 A1 | | 1/2014 | Kaye, Jr. et al. | |
| 2014/0203529 A1 | * | 7/2014 | Ortega | ...................... B62B 7/02 |
| | | | | 280/47.25 |
| 2015/0353116 A1 | | 12/2015 | Leys et al. | |
| 2017/0050660 A1 | * | 2/2017 | Xu | ............................ B62B 7/08 |

(Continued)

OTHER PUBLICATIONS

International Search Report and Written Opinion for PCT/US2024/029962 dated Oct. 10, 2024 (12 pages)/.

(Continued)

*Primary Examiner* — Erez Gurari

(74) *Attorney, Agent, or Firm* — Barnes & Thornburg LLP

(57) ABSTRACT

A jogging stroller that operates in a walk mode and a run mode. The stroller has a frame having a handle, a front wheel and two rear wheels. The stroller also has a wheel locking mechanism to lock and unlock the front wheel from rotating about a pivot axle of the wheel. The wheel locking mechanism is operated by a twist assembly of the handle. The stroller also has a handle locking mechanism to lock the twist assembly and the wheel locking mechanism in one of the walk mode and the run mode. Additionally, a user can temporarily move the twist assembly to an actuated position when the handle locking mechanism is in the run mode to allow the front wheel to rotate about the pivot axis until the twist assembly is returned to the normal position.

20 Claims, 9 Drawing Sheets

(56) References Cited

U.S. PATENT DOCUMENTS

| | | | | |
|---|---|---|---|---|
| 2017/0174244 A1* | 6/2017 | Sack | ......................... | B62B 9/12 |
| 2018/0141578 A1* | 5/2018 | Yuan | ...................... | B62B 7/044 |
| 2021/0163054 A1* | 6/2021 | De Vrede | ................ | B62B 5/067 |
| 2022/0073121 A1* | 3/2022 | Sklenar | ..................... | B62B 9/20 |
| 2024/0101179 A1* | 3/2024 | Stacey | ................... | B62B 7/044 |
| 2024/0253684 A1* | 8/2024 | Huang | ..................... | B62B 9/12 |
| 2026/0008302 A1* | 1/2026 | Liu | ....................... | B60B 33/026 |

OTHER PUBLICATIONS

"Radio Flyer EZ Fold 4 in 1 Stroll N Trike Versatile Infant Toddler Stroller Tricycle." available at least as early as Mar. 9, 2023 (11 pages).

"BOB Gear Revolution Flex 3.0 Jogging Stroller," available at least as early as Mar. 9, 2023 (11 pages).

"BOB Gear Alterrain Pro Jogging Stroller," available at least as early as Mar. 9, 2023 (10 pages).

"Joovy Zoom360 Ultralight Jogging Stroller Featuring High Child Seat, Shock-Absorbing Suspension, Extra-Large Air-Filled Tired, Parent Organizer, Air Pump, and Easy One-Hand Fold," available at least as early as Mar. 9, 2023 (9 pages).

"Thule Spring Compact Stroller," available at least as early as Mar. 9, 2023 (9 pages).

"Thule Urban Glide 2 Jogging Stroller," available at least as early as Mar. 9, 2023 (10 pages).

"Guava Roam Stroller," available at least as early as Mar. 9, 2023 (18 pages).

"Graco FastAction Jogger LX Stroller—Drive, Convenient One-Hand Fold, Infant Car Seat Compatible," available at least as early as Mar. 9, 2023 (9 pages).

* cited by examiner

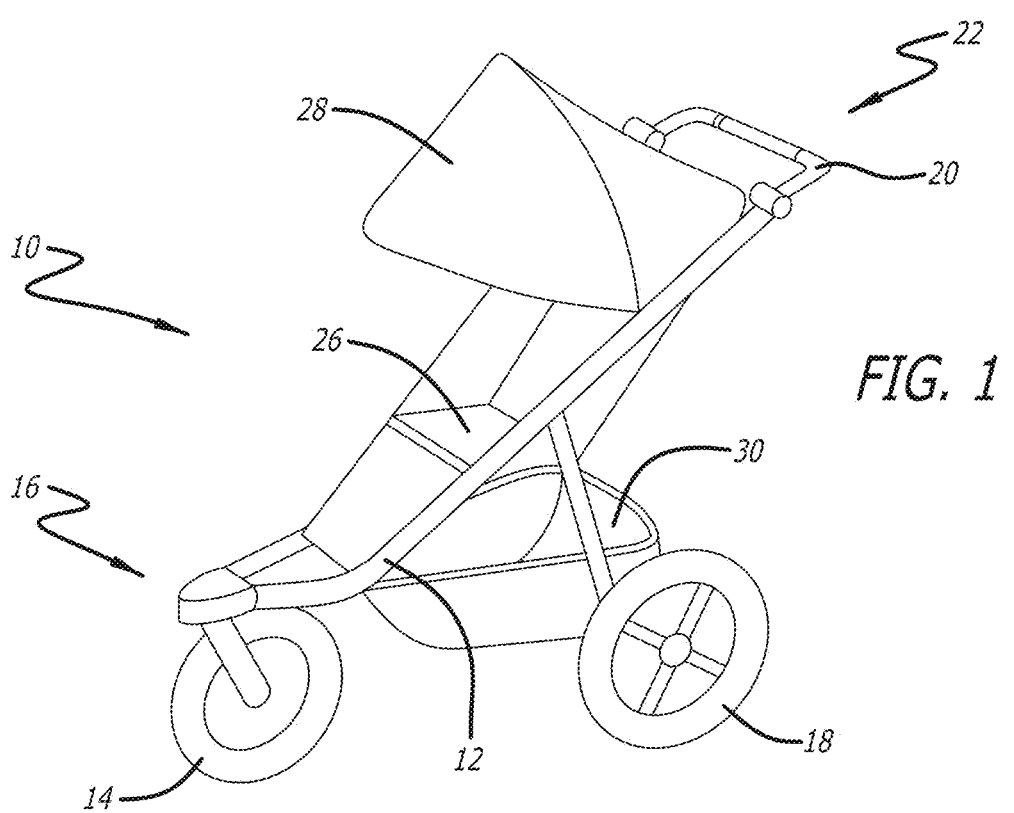
*FIG. 1*
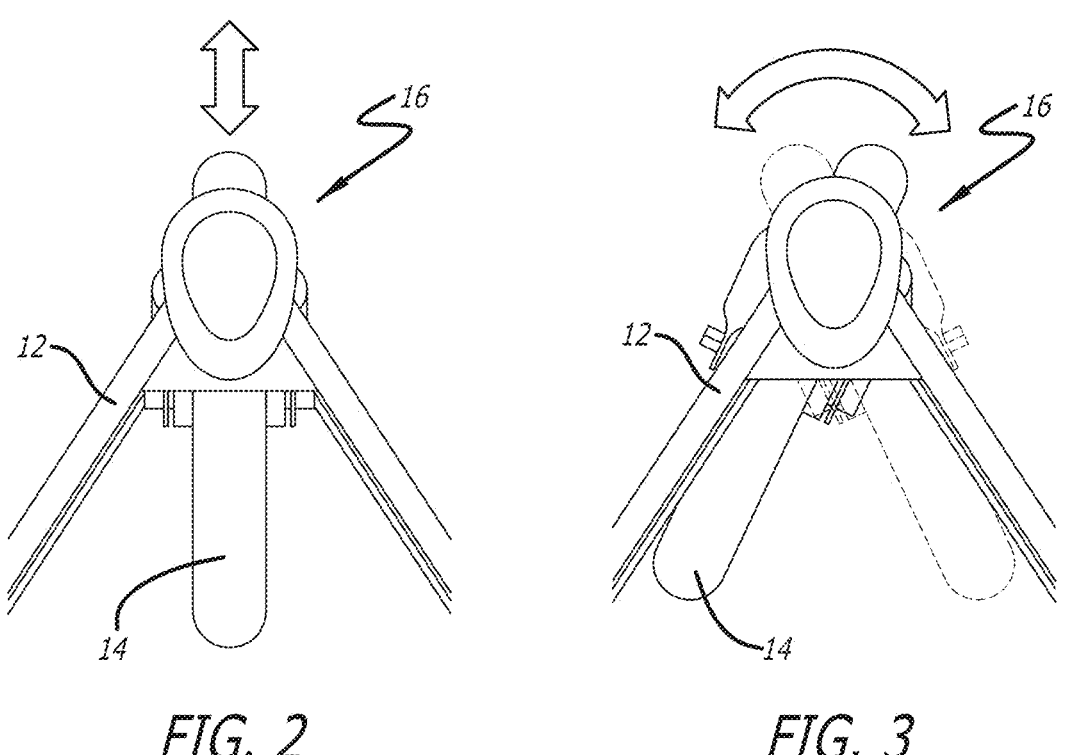
*FIG. 2*          *FIG. 3*

JOGGING STROLLER

CROSS-REFERENCE TO RELATED APPLICATIONS

This application claims the benefit of U.S. Provisional Patent Application No. 63/467,473 filed May 18, 2023, which is expressly incorporated herein by reference and made a part hereof.

FEDERALLY SPONSORED RESEARCH OR DEVELOPMENT

Not Applicable.

TECHNICAL FIELD

The present subject matter relates to a jogging stroller, and more particularly, to a jogging stroller with a releasable front wheel and a release mechanism for the wheel.

BACKGROUND

Strollers, including jogging strollers, are known in the art. While such products according to the prior art provide a number of advantages, they nevertheless have certain limitations, especially when combined together. The present disclosure seeks to overcome certain of those limitations and other drawbacks of the prior art, and to provide new features not heretofore available. A full discussion of the features and advantages of the present disclosure is deferred to the following detailed description, which proceeds with reference to the accompanying drawings.

SUMMARY

According to certain aspects of the present disclosure, the disclosed subject technology relates to jogging strollers that have run modes and walk modes where a front wheel is either locked in a forward position or able to be rotated about a pivot axle of the front wheel.

The disclosed technology further relates to a jogging stroller having a walk mode and a run mode, comprising: a frame having an upper housing assembly pivotally attached to a lower housing assembly to allow the frame to fold; the lower housing assembly having a front wheel and two rear wheels, wherein the front wheel is locked in a forward positon in the run mode of the jogging stroller, and wherein the front wheel is able to rotate about a pivot axle in the walk mode of the jogging stroller; a wheel locking mechanism to lock and unlock the front wheel from rotating about the pivot axle, the wheel locking mechanism comprising a receiver connected to the front wheel, a locking member, a bias member and a cable, wherein the locking member engages the receiver in a locked mode to prevent the front wheel from rotating about the pivot axle, wherein the locking member disengages from the receiver in an unlocked mode to allow the wheel to rotate about the pivot axle, wherein the bias member biases the locking member toward the receiver, and wherein the cable has a first end connected to the locking member; the upper housing assembly of the frame having a handle and a twist assembly, wherein a second end of the cable is connected to the twist assembly, wherein the twist assembly has a normal position and an actuated position, the twist assembly operating to move the wheel locking mechanism from the locked mode to the unlocked mode when the twist assembly is in the actuated position to allow the front wheel to rotate about the pivot axle in the unlocked mode, and to move the wheel locking mechanism from the unlocked mode to the locked mode when the twist assembly is in the normal position to lock the front wheel in the forward position; and, a handle locking mechanism to operably lock the twist assembly and the wheel locking mechanism in one of the walk mode and the run mode, and to operably lock the twist assembly and the wheel locking mechanism in the other of the walk mode and the run mode, and wherein the user can temporarily move the twist assembly to the actuated position when the handle locking mechanism is in the run mode to allow the front wheel to rotate about the pivot axis until the twist assembly is returned to the normal position.

The disclosed technology further relates to a jogging stroller having a walk mode and a run mode, comprising: a frame; a front wheel and two rear wheels attached to the frame, wherein the front wheel is locked in a forward positon in the run mode of the jogging stroller, and wherein the front wheel is able to rotate about a pivot axle in the walk mode of the jogging stroller; a wheel locking mechanism to lock and unlock the front wheel from rotating about the pivot axle, the wheel locking mechanism comprising a receiver connected to the front wheel, a locking member that engages the receiver in a locked mode and that disengages from the receiver in an unlocked mode, a bias member to bias the locking member toward the receiver, and a cable, wherein the cable has a first end connected to the locking member; and, a handle connected to the frame, the handle having a twist assembly, wherein a second end of the cable is connected to the twist assembly, wherein the twist assembly has a normal position and an actuated position, the twist assembly operating to move the wheel locking mechanism from the locked mode to the unlocked mode when the twist assembly is in the actuated position to allow the front wheel to rotate about the pivot axle in the unlocked mode, and to move the wheel locking mechanism from the unlocked mode to the locked mode when the twist assembly is in the normal position to lock the front wheel in the forward position.

The disclosed technology further relates to a jogging stroller having a walk mode and a run mode, comprising: a frame having an upper housing assembly pivotally attached to a lower housing assembly to allow the frame to fold; a front wheel and two rear wheels attached to the lower housing assembly of the frame, wherein the front wheel is locked in a forward positon in the run mode of the jogging stroller, and wherein the front wheel is able to rotate about a pivot axle in the walk mode of the jogging stroller; a wheel locking mechanism to lock and unlock the front wheel from rotating about the pivot axle, the wheel locking mechanism comprising a receiver connected to the front wheel, a locking member that engages the receiver in a locked mode and that disengages from the receiver in an unlocked mode, a bias member to bias the locking member toward the receiver, and a cable, wherein the cable has a first end connected to the locking member; and, a handle connected to the frame, the handle having a twist assembly, wherein a second end of the cable is connected to the twist assembly, wherein the twist assembly has a normal position and an actuated position, the twist assembly operating to move the wheel locking mechanism from the locked mode to the unlocked mode when the twist assembly is in the actuated position to allow the front wheel to rotate about the pivot axle in the unlocked mode, and to move the wheel locking mechanism from the unlocked mode to the locked mode when the twist assembly is in the normal position to lock the front wheel in the forward position.

The disclosed technology further relates to a jogging stroller, wherein the front wheel is a caster wheel having a wheel shaft positioned behind a pivot axle of the front wheel.

The disclosed technology further relates to a jogging stroller, wherein the receiver has an opening, and wherein the locking member has a finger that is inserted into the opening in the receiver when the locking mechanism is in the locked mode.

The disclosed technology further relates to a jogging stroller, wherein the handle locking mechanism comprises a locking collar adjacent the twist assembly.

The disclosed technology further relates to a jogging stroller, wherein the locking collar moves from a locked mode to an unlocked mode, and wherein the locking collar stays in the locked mode until moved by the user to the unlocked mode.

The disclosed technology further relates to a jogging stroller, wherein the cable extends from the wheel locking mechanism to the twist assembly.

The disclosed technology further relates to a jogging stroller, further comprising a bias member in the twist assembly to bias the twist assembly to the normal position.

The disclosed technology further relates to a jogging stroller, further comprising a cam follower within the twist assembly, the cam follower moving axially upon rotational movement of the twist assembly.

The disclosed technology further relates to a jogging stroller, wherein the second end of the cable is connected to the cam follower.

The disclosed technology further relates to a jogging stroller, wherein the frame comprises an upper housing assembly pivotally attached to a lower housing assembly to allow the frame to fold.

The disclosed technology further relates to a jogging stroller, further comprising a handle locking mechanism to operably lock the twist assembly and the wheel locking mechanism in one of the walk mode and the run mode, and to operably lock the twist assembly and the wheel locking mechanism in the other of the walk mode and the run mode, and wherein the user can temporarily move the twist assembly to the actuated position when the handle locking mechanism is in the run mode to allow the front wheel to rotate about the pivot axis until the twist assembly is returned to the normal position.

The disclosed technology further relates to a jogging stroller, wherein the handle locking mechanism comprises a locking collar adjacent the twist assembly, wherein the locking collar moves from a locked mode to an unlocked mode, and wherein the locking collar stays in the locked mode until moved by the user to the unlocked mode.

It is understood that other embodiments and configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

To understand the present disclosure, it will now be described by way of example, with reference to the accompanying drawings in which embodiments of the disclosures are illustrated and, together with the descriptions below are incorporated in and constitute a part of this specification, and serve to explain the principles of the disclosure. In the drawings:

FIG. 1 is a front top perspective view of a jogging stroller, according to the present disclosure.

FIG. 2 is a partial top view of the front wheel of a jogging stroller, according to the present disclosure, with the front wheel in locked jogger mode.

FIG. 3 is a partial top view of the front wheel of a jogging stroller, according to the present disclosure, with the front wheel in rotatable mode.

Figure 4:
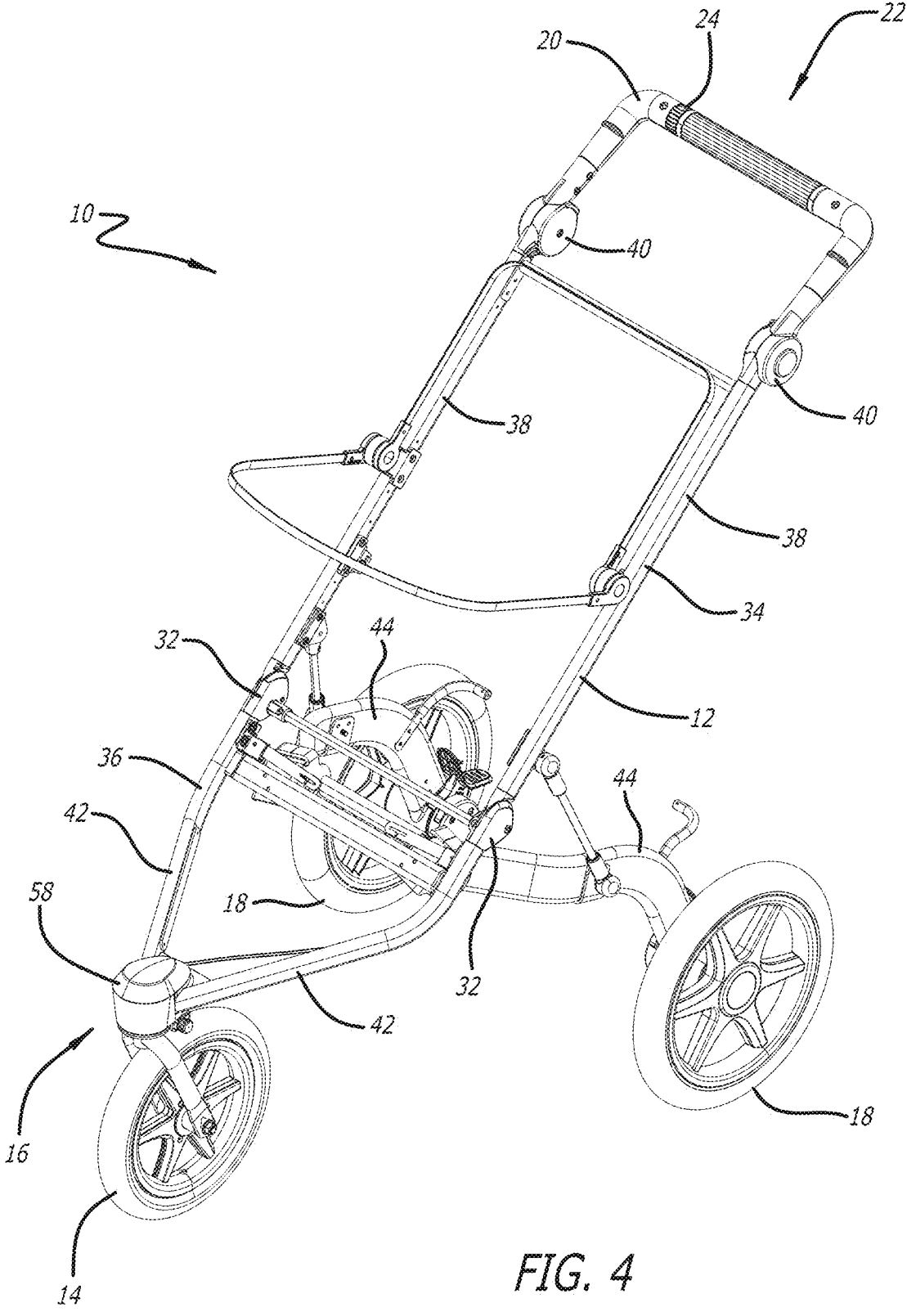
FIG. 4 is a front perspective view of a frame of a jogging stroller, according to the present disclosure, with the fabric removed.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

While this disclosure is susceptible of embodiments in many different forms, there is shown in the drawings and will herein be described in detail preferred embodiments with the understanding that the present disclosure is to be considered as an exemplification of the principles of the disclosure and is not intended to limit the broad aspect of the disclosure to the embodiments illustrated. It should be noted that the features illustrated in the drawings are not necessarily drawn to scale, and features of one embodiment may be employed with other embodiments as one of ordinary skill in the relevant art would recognize, even if not explicitly stated herein. Further, descriptions of well-known components and processing techniques may be omitted so as to not unnecessarily obscure the embodiments of the present disclosure. The examples used herein are intended merely to facilitate an understanding of ways in which the present disclosure may be practiced and to further enable those of ordinary skill in the art to practice the embodiments of the present disclosure. Accordingly, the examples and embodiments herein should not be construed as limiting the scope of the present disclosure, which is defined solely by the appended claims and applicable law.

Generally, this disclosure describes several embodiments of jogging strollers 10 that are arrangeable in a variety of different orientations, both alone and in combination, and which have a variety of different functionality. In one embodiment, the jogging stroller 10 collapses and folds for storage and transportation. In another embodiment, the jogging stroller 10 has a run mode and a walk mode. In another embodiment, the jogging stroller 10 has a locking collar to retain the jogging stroller 10 in either run mode or walk mode, as desired by the user. In another embodiment, the jogging stroller 10 has a twist handle for instantaneous transition between the run and walk modes.

Referring now to the figures, and initially to FIGS. 1 and 4, there is shown an embodiment of the jogging stroller 10. In one embodiment, the jogging stroller 10 has a frame 12, a front wheel 14 that is rotatable and lockable, a front wheel locking mechanism 16, two rear wheels 18, a handle 20, a handle twist assembly 22, a locking collar 24 to lock the handle twist assembly 22 and the front wheel locking mechanism 16 in one of two modes, including walk mode and run mode, a seat 26, a canopy 28, and a storage receptacle 30.

In one embodiment, as best shown in FIG. 4, the frame 12 is a folding frame that folds about pivot members 32. The frame 12 comprises an upper housing assembly 34 and a lower housing assembly 36, with the pivot members 32 joining the upper housing assembly 34 and the lower housing assembly 36. The upper housing assembly 34 comprises, among other things, two upper side bars 38, the handle 20, a handle pivot 40 pivotally connecting the handle 20 to the upper side bars 38, the handle twist assembly 22 and the locking collar 24. The lower housing assembly 36 comprises, among other things, lower side bars 42, rear wheel supports 44, the front wheel 14, the rear wheels 18 and the front wheel locking mechanism 16. Additionally, a locking cable 46 extends from the front wheel locking mechanism 16 to the handle twist assembly 22.

Figure 5:
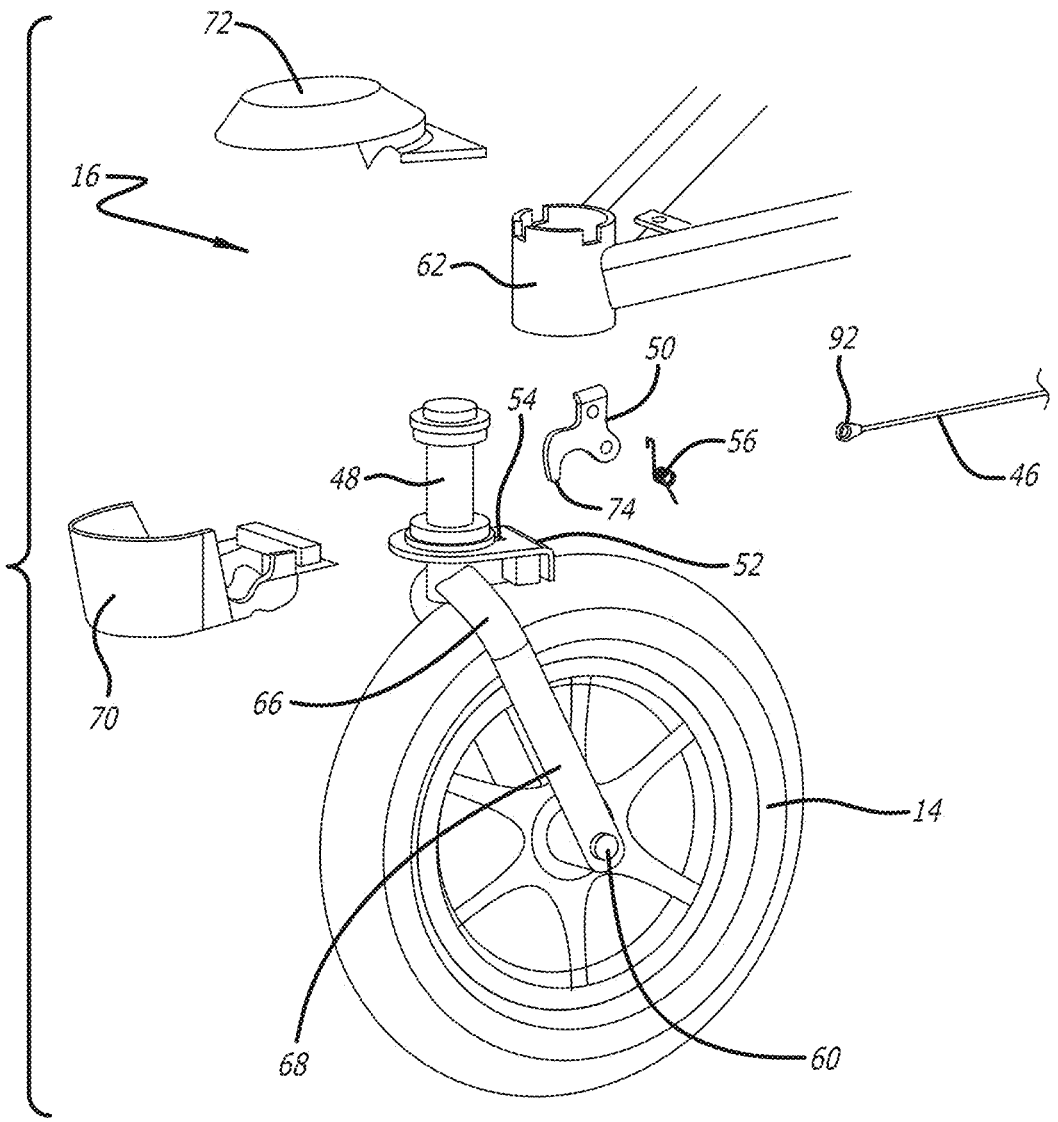
FIG. 5 is an exploded front top perspective view of the front wheel of the jogging stroller of FIG. 1, according to the present disclosure.
Figure 6:
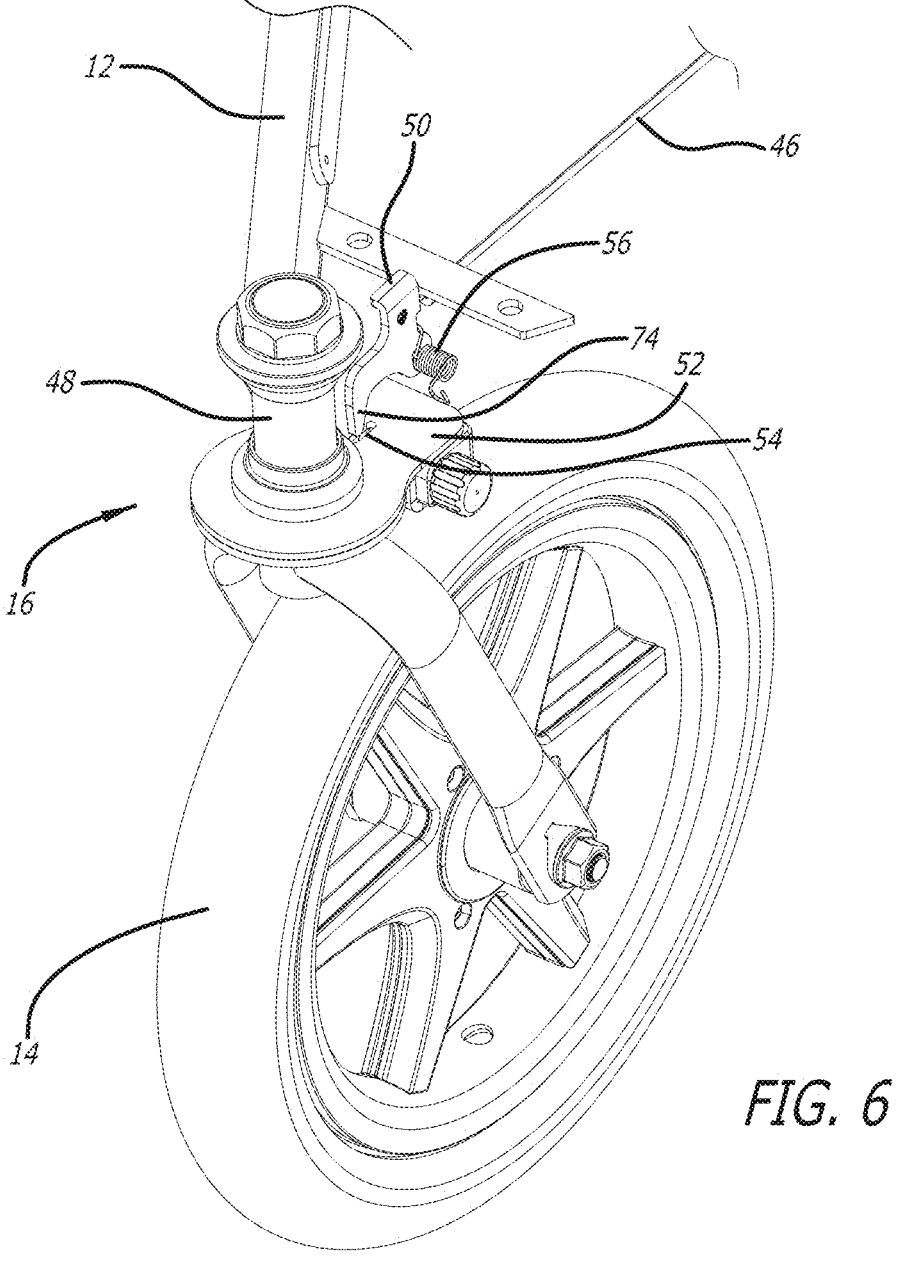
FIG. 6 is a partial front top perspective view of the front wheel of the jogging stroller of FIG. 1, according to the present disclosure, with the housing removed to show the front wheel locking mechanism.

In walk mode, as shown in FIG. 3, the front wheel locking mechanism 16 is unlocked and the front wheel 14 is able to pivot about its pivot axle 48 (see FIG. 5). Conversely, in run mode the front wheel 14 is locked in the straight position as shown in FIG. 2, and cannot pivot about its pivot axle 48.

Referring to FIG. 5, in one embodiment, the front wheel locking mechanism 16 generally comprises the front wheel 14 having its pivot axle 48, a locking member 50, a receiver 52 having an opening 54 to receive the locking member 50, a bias member 56, a housing 58, and the locking cable 46. The front wheel 14, in one embodiment, as show in FIGS.

Figure 7:
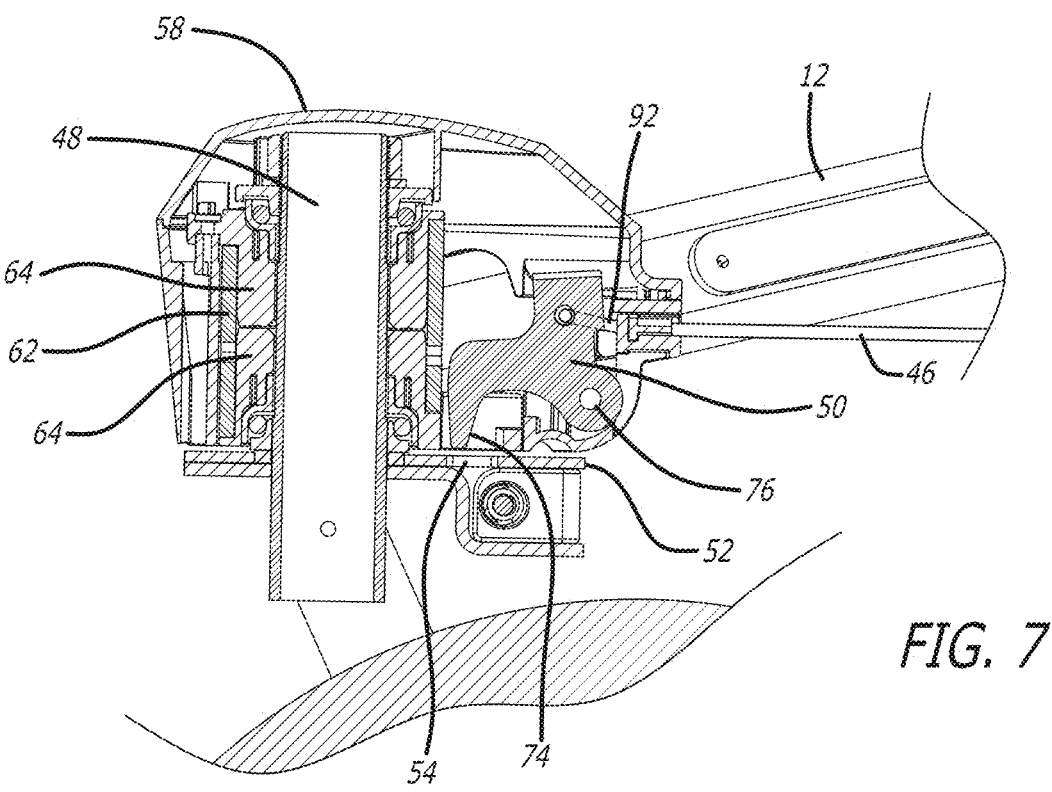
FIG. 7 is a cross-sectional view of the front wheel assembly and front wheel locking mechanism, according to the present disclosure, with the front wheel locking mechanism in the unlocked mode.
Figure 8:
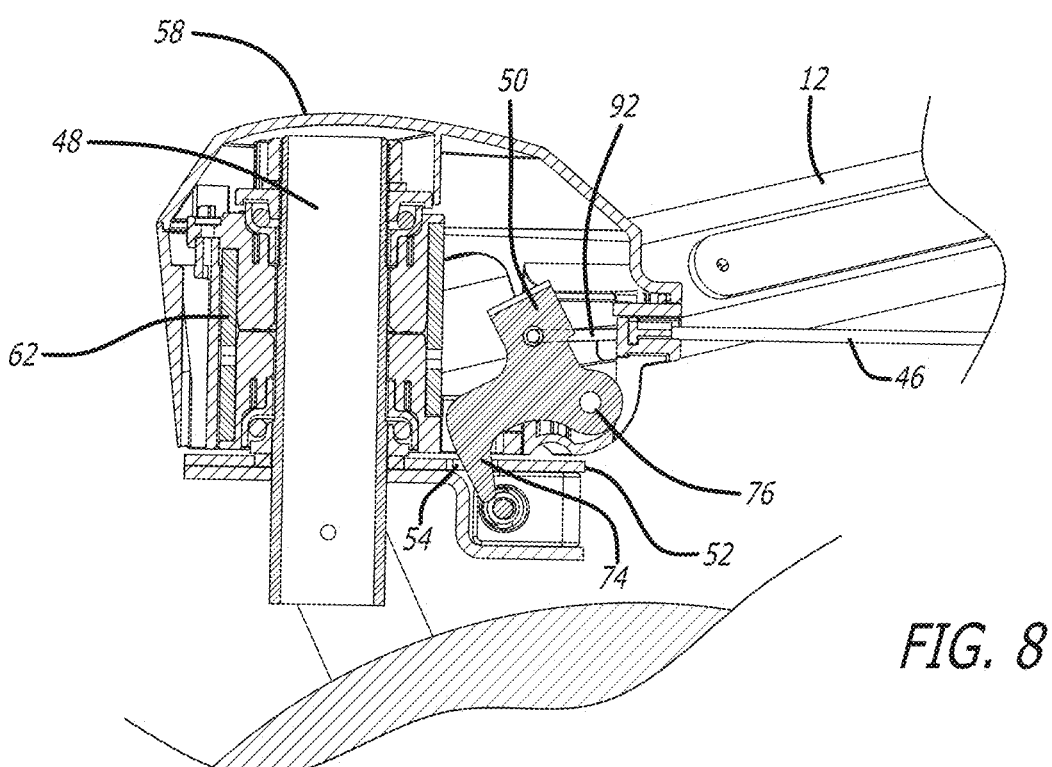
FIG. 8 is a cross-sectional view of the front wheel assembly and front wheel locking mechanism, according to the present disclosure, with the front wheel locking mechanism in the locked mode.
Figure 9:
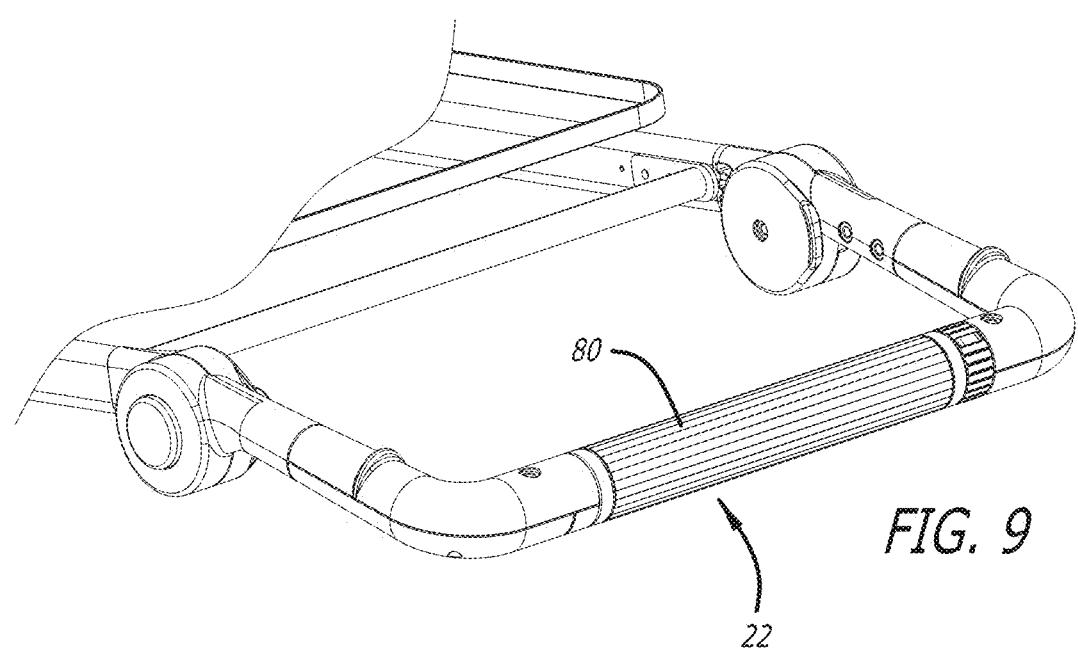
FIG. 9 is a partial rear perspective view of the handle of the jogging stroller, according to the present disclosure.

5 and 6, is a caster wheel. Accordingly, the wheel shaft 60 is positioned behind the pivot axle 48 of the front wheel 14. When not locked, the front wheel 14 is able to rotate via its pivot axle 48. The pivot axle 48 can rotate within the head tube 62 with the assistance of bearings 64 or bushings 64 as shown in FIGS. 7 and 8. In one embodiment, the receiver 52 is fixed to the front wheel support 66, typically being either the front wheel fork 68 or the pivot axle 48. Thus, when the front wheel 14 rotates about its pivot axle 48 the receiver 52 rotates along with the front wheel 14. In a preferred embodiment, the receiver 52 is operably fixed adjacent the pivot axle 48.

In one embodiment, the housing 58 of the front wheel locking mechanism 16 comprises a lower housing member 70 and an upper housing member 72. The locking member 50 is positioned within the housing 58. The locking member 50 has a finger 74 that is adapted to mate with the opening 54 in the receiver 52. The locking member 50 also pivots within the housing 58 about a pivot axis 76 from an engaged position, shown in FIG. 8 where the finger 74 of the locking member 50 is positioned within the opening 54 of the receiver 52, to a disengaged position, shown in FIG. 7, where the finger 74 is removed from the opening 54 of the receiver 52. When the locking member 50 is in the engaged position the front wheel 14 is locked in the straight forward position-see FIG. 2. When the locking member 50 is in the disengaged position the front wheel 14 is able to rotate freely about its pivot axle 48. In one embodiment, the locking member 50 is biased toward the engaged position via the bias member 56. The locking cable 46 is connected to the locking member 50 and operates to move the locking member 50 to the disengaged position. When operated by the handle twist assembly 22, the locking cable 46 can move the locking member 50 to the disengaged position against the force of the bias member 56, and further the handle twist assembly 22 can move the locking cable 46 to allow the bias member 56 to bias the locking member 50 to engage the receiver 52 by biasing the finger 74 into the opening 54 of the receiver 52 when the front wheel 14 is moved to the straight position.

Figure 13:
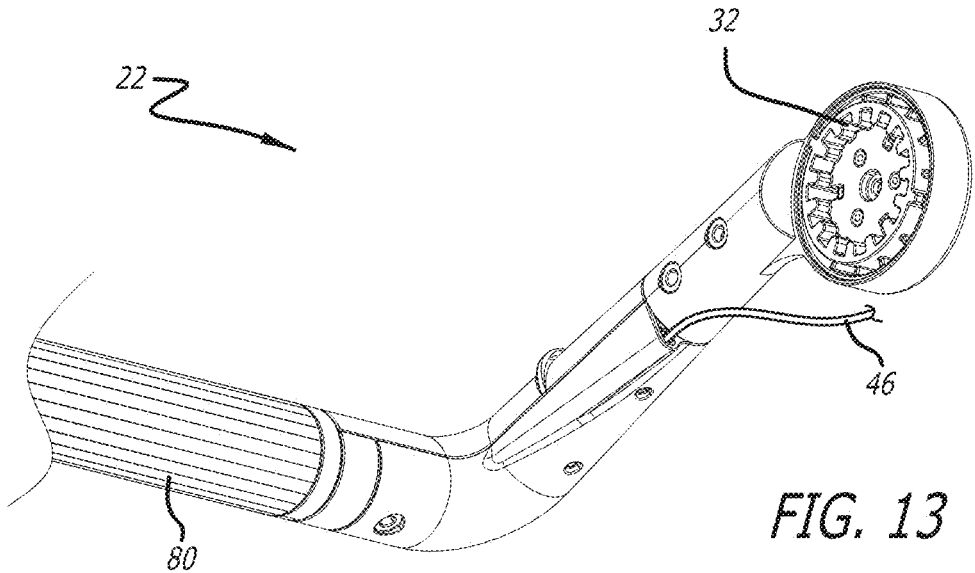
FIG. 13 is a perspective view of the caster lock cable for the jogging stroller, according to the present disclosure.

Referring to FIGS. 9-14, the locking cable 46 is operated by the handle twist assembly 22. In one embodiment, the handle twist assembly 22 comprises a twist handle 80, two twist caps 82, an internal shaft 84, two cam follower collars 86, bias members 88, the locking collar 24, and the locking cable 46. The internal shaft 84 does not rotate, but instead remains fixed in position. In one embodiment, the locking cable 46 has a first end 90 and a second end 92. The first end 90 of the locking cable 46 is connected to one of the cam follower collars 86, and the second end of the locking cable 46 is connected to the locking member 50. The locking cable 46 is shown in FIG. 13 extending from the handle twist assembly 22 and past the pivot members 32 where it will go into the lower side bars 42 of the lower housing assembly 36.

Figure 10:
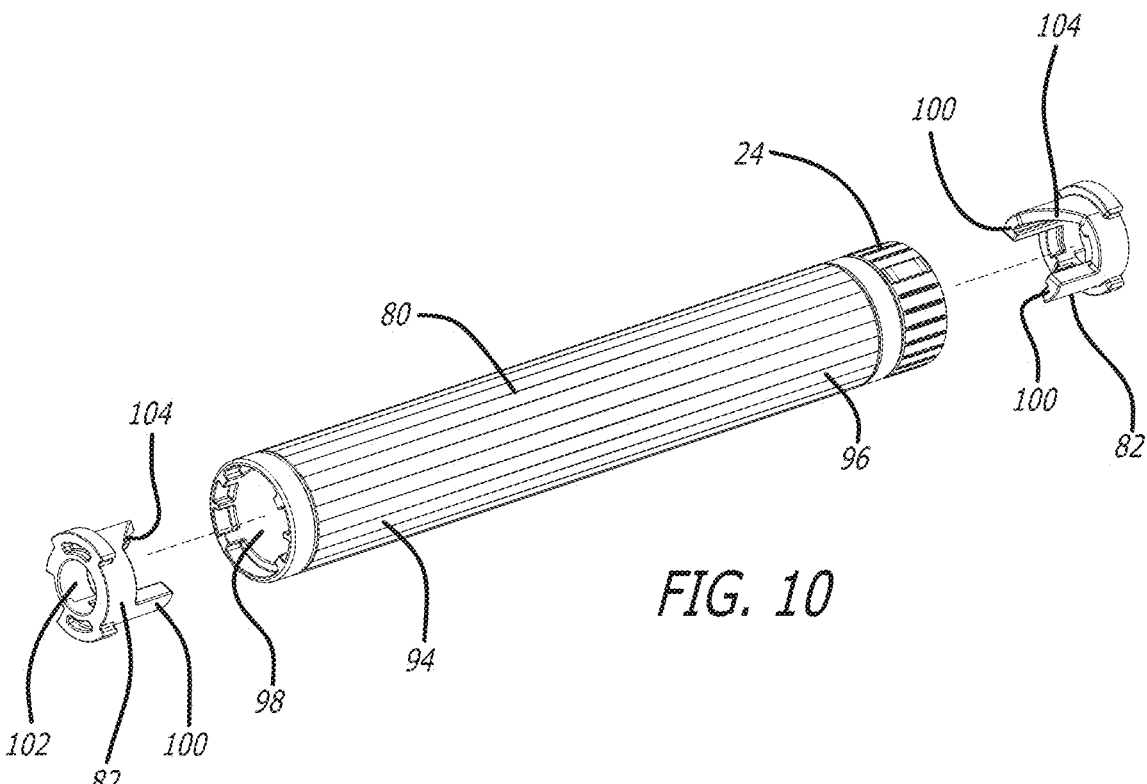
FIG. 10 is a partially exploded view of the handle of the jogging stroller, according to the present disclosure.
Figures 11, 12:
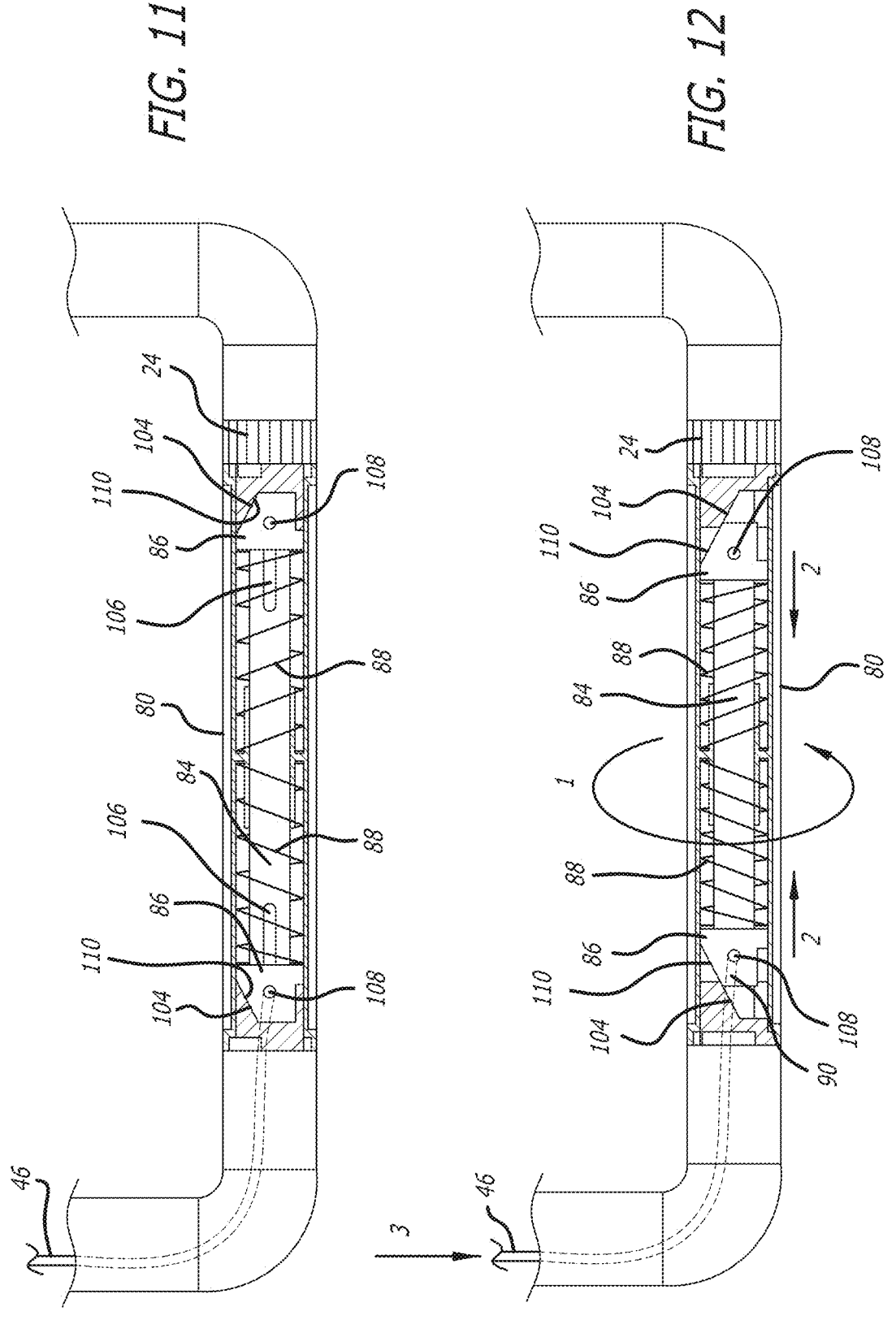
FIG. 11 is a cross-sectional view of the handle of the jogging stroller, according to the present disclosure, with the front wheel locking mechanism in the locked mode.
FIG. 12 is a cross-sectional view of the handle of the jogging stroller, according to the present disclosure, with the front wheel locking mechanism in the unlocked mode.

The twist handle 80 has a first end 94, a second end 96, and an internal bore 98. As shown in FIG. 10, one of the twist caps 82 is secured to the twist handle 80 at the first end 94 thereof, and the other of the twist caps 82 is secured to the twist handle 80 at the second end 96 thereof. The twist caps 82 have fingers 100 that engage an interior surface of the twist handle 80 to rotationally fix the twist caps 82 to the twist handle 80. The twist caps 82 also have a central bore 102 to allow the internal shaft 84 to pass through the twist caps 82. As shown in FIGS. 10-12, the twist caps 82 have a cam surface 104. The cam surface 104 of the twist caps 82 mates with the cam follower collars 86 as is explained herein.

In one embodiment, the internal shaft 84 has a plurality of axially extending slots 106. The cam follower collars 86 have a pin 108 extending therefrom. The pins 108 extend into the slots 106 of the internal shaft 84. Because the pins 108 are secured to the cam follower collars 86, the cam follower collars 86 are fixed rotationally with respect to the internal shaft 84, but are able to move axially with respect to the internal shaft 84 about the slot 106 of the internal shaft 84. The cam follower collars 86 move axially from a first position, shown in FIG. 11, to a second position, shown in FIG. 12.

As shown in FIGS. 10-12, the cam follower collars 86 have a cam follower surface 110 that mates with the cam surface 104 of the twist caps 82. The twist caps 82 are rotationally fixed to the twist handle 80. Thus, as the twist handle 80 is rotated by the user the twist caps 82 will be simultaneously rotated.

In the run mode the twist handle 80 is not rotated and is in its normal position. When the twist handle 80 is in its normal position the bias members 88 operate to bias the cam follower collars 86 to their first position, as shown in FIG. 11. When the cam follower collars 86 are in their first position the locking cable 46 is in its forward position allowing the bias member 56 to bias the locking member 50 to its engaged position with the receiver 52 (see FIG. 8) such that the front wheel 14 is locked in the straight forward position-see FIG. 2.

When the twist handle 80 is rotated backward to its actuated position from its normal position, as shown in FIG. 12, the twist caps 82 are simultaneously rotated with the twist handle 80. When the twist caps 82 rotate the cam surface 104 of the twist caps 82 operates to manipulate the cam follower collars 86 via the cam follower surface 110. However, the cam follower collars 86 do not rotate because the pins 108 are positioned within the slot 106 of the internal shaft 84 and thus the cam follower collars 86 can only move axially. Accordingly, as the twist caps 82 rotate the cam follower collars 86 move axially inwardly against the bias members 88 as shown in FIG. 12. Since the first end 90 of the locking cable 46 is connected to one of the cam follower collars 86, the locking cable 46 is moved toward the handle twist assembly 22, which simultaneously operates to pull the locking member 50 and pivots the locking member 50 about its pivot axis 76 from the engaged position, shown in FIG. 8 where the finger 74 of the locking member 52 is positioned within the opening 54 of the receiver 52, to the disengaged position, shown in FIG. 7, where the finger 74 is removed from the opening 54 of the receiver 52. When the locking member 50 is in its disengaged position the front wheel 14 is free to rotate as shown in FIG. 3.

The locking member 50 will remain in the disengaged position as long as the user holds the twist handle 80 in the rotated backward position. As soon as the user lets go of the twist handle 80 the bias members 88 within the twist handle 80 operate to push the cam follower collars 86 back to their outward position as shown in FIG. 11 and simultaneously rotate the twist handle 80 from its actuated or rotated backward position to its normal position. When the cam follower collars 86 are moved axially outward to their normal position the locking cable 46 will move away from the handle twist assembly 22, which simultaneously operates to allow the bias member 56 to rotate the locking member 50 to its engaged position. Then, as soon as the front wheel 14 rotates and passes to its forward orientation the bias member 56 will push the finger 74 of the locking member 50 into the opening 54 of the receiver 52 to lock the front wheel 14 in the straight forward position as shown in FIG. 2. Thus, the twist handle 80 operates as a quick release to provide the user with the ability to instantaneously turn the jogging stroller 10 as needed.

In one embodiment, the jogging stroller 10 also has a handle locking mechanism 120 to lock the front wheel locking mechanism 16 and handle twist assembly 22 in either the walk mode or the jog mode. The handle locking mechanism 120 comprises the combination of the locking collar 24, a locking insert 122 and a spring 124, that interact with the twist handle 80.

Figure 14:
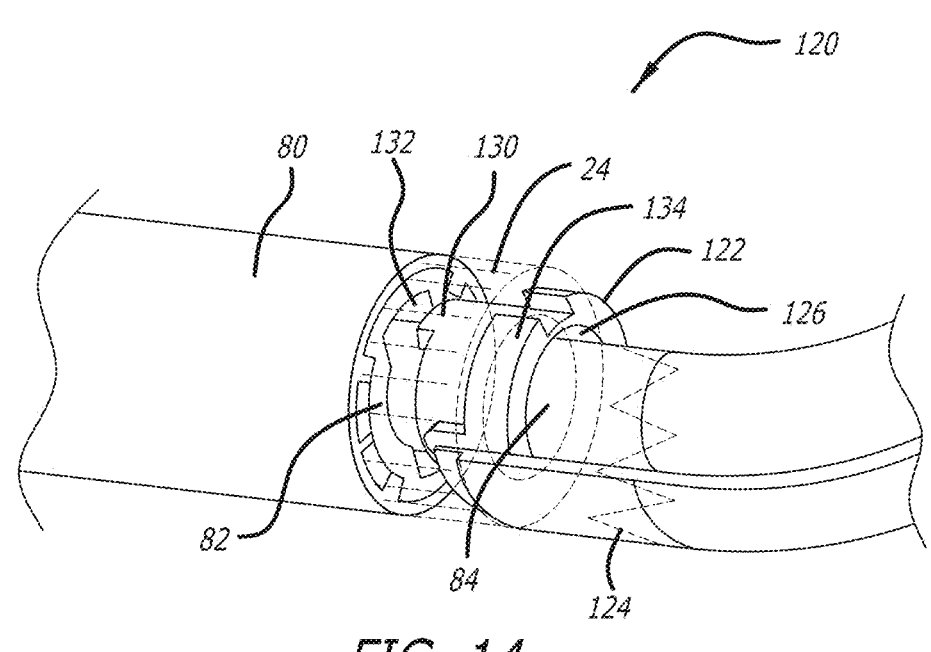
FIG. 14 is a perspective view of the handle of the jogging stroller, according to the present disclosure, showing the lock collar, which is in phantom lines, in the run mode and the front wheel locking mechanism in the locked mode.
Figure 15:
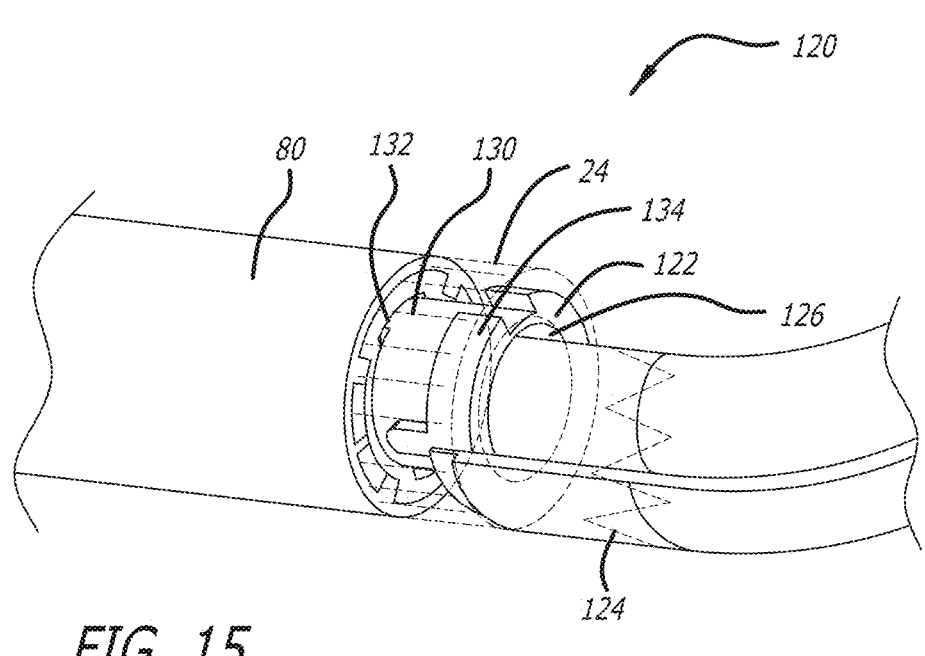
FIG. 15 is a perspective view of the handle of the jogging stroller, according to the present disclosure, showing the lock collar, which is in phantom lines, in the walk mode and the front wheel locking mechanism in the unlocked mode.
Figure 16:
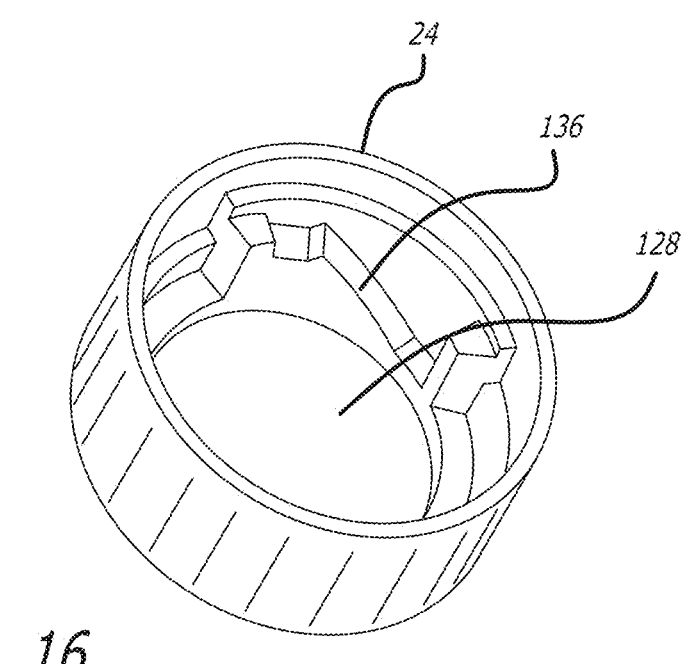
FIG. 16 is a perspective view of the lock collar for the jogging stroller, according to the present disclosure.

As shown in FIG. 14, in one embodiment the locking insert 122 generally resides under the locking collar 24. In one embodiment, the locking insert 122 has a bore 126 and the internal shaft 84 extends through the bore 126, and the locking collar 24 has a bore 128 and the locking insert 122 is positioned at least partially within the bore 128 of the locking collar 24. The locking insert 122 also has tabs 130 that mate with mating keyways 132 in the twist caps 82 when the locking insert 122 is rotationally positioned in the proper rotational position with respect to the twist cap 82. In one embodiment, the locking insert 122 also has protrusions 134 that mate with internal cams 136 on the bore 128 of the locking collar 24. The combination of the locking collar 24 and locking insert 122 operates to provide a mechanism to keep the jogging stroller 10 in either the walk mode, whereby the front wheel 14 will rotate, or run mode, whereby the front wheel 14 remains fixed in the forward orientation, until changed by the user.

To lock the front wheel 14 in walk mode so that the front wheel 14 rotates during use, the user rotates the locking collar 24 backward. When the locking collar 24 is rotated backward the internal cams 136 on the locking collar 24 no longer block the protrusions 134 on the locking insert 122, and the spring 124 can bias the locking insert 122 toward the twist cap 82 in the twist handle 80. The user then rotates the twist handle 80 backward so that the tabs 130 of the locking insert 122 align with the mating keyways 132 in the twist caps 82. At that point the spring 124 will force the tabs 130 of the locking insert 122 into the keyways 132 of the twist cap 82. When the tabs 130 of the locking insert 122 into the keyways 132 of the twist cap 82 the twist handle 80 will remain in the rotated back position. As explained above, when the twist handle 80 is rotated backward to its actuated position from its normal position, as shown in FIG. 12, the cam follower collars 86 move axially inwardly against the bias members 88 as shown in FIG. 12 and the locking cable 46 is moved toward the handle twist assembly 22, which simultaneously operates to pull the locking member 50 and pivots the locking member 50 about its pivot axis 76 from the engaged position, shown in FIG. 8 where the finger 74 of the locking member 52 is positioned within the opening 54 of the receiver 52, to the disengaged position, shown in FIG. 7, where the finger 74 is removed from the opening 54 of the receiver 52. When the locking member 50 is in its disengaged position the front wheel 14 is free to rotate as shown in FIG. 3. The locking member 50 will remain in its disengaged position until the locking collar 24 is rotated from the walk position to the run position.

To unlock the front wheel 14 from the walk mode and transition the jogging stroller 10 into the run mode where the front wheel 14 is locked in the forward position, the user rotates the locking collar 24 forward. When the locking collar 24 is rotated forward the internal cams 136 on the locking collar 24 will pull back on the protrusions 134 on the locking insert 122 to axially move the locking insert 122 so that the tabs 130 of the locking insert 122 are removed from the mating keyways 132 in the twist caps 82. As soon as the tabs 130 of the locking insert 122 are removed from the mating keyways 132 in the twist caps 82 the bias members 88 within the twist handle 80 operate to push the cam follower collars 86 back to their outward position as shown in FIG. 11 and simultaneously rotate the twist handle 80 from its actuated or rotated backward position to its normal position. When the cam follower collars 86 are moved axially outward to their normal position the locking cable 46 will move away from the handle twist assembly 22, which simultaneously operates to allow the bias member 56 to rotate the locking member 50 to its engaged position. Then, as soon as the front wheel 14 rotates and passes to its forward orientation the bias member 56 will push the finger 74 of the locking member 50 into the opening 54 of the receiver 52 to lock the front wheel 14 in the straight forward position as shown in FIG. 2. The locking member 50 will remain in its engaged position until the locking collar 24 is rotated from the run position to the walk position.

The embodiments detailed hereinabove may be combined in full or in part, with any alternative embodiments described.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. Relational terms such as first and second and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

Numerous modifications to the present disclosure will be apparent to those skilled in the art in view of the foregoing description. Preferred embodiments of this disclosure are described herein, including the best mode known to the inventors for carrying out the disclosure. It should be understood that the illustrated embodiments are exemplary only, and should not be taken as limiting the scope of the disclosure.

Several alternative embodiments and examples have been described and illustrated herein. A person of ordinary skill in the art would appreciate the features of the individual embodiments, and the possible combinations and variations of the components. A person of ordinary skill in the art would further appreciate that any of the embodiments could be provided in any combination with the other embodiments disclosed herein. Additionally, the terms "first," "second," "third," and "fourth" as used herein are intended for illustrative purposes only and do not limit the embodiments in any way. Further, the term "plurality" as used herein indicates any number greater than one, cither disjunctively or conjunctively, as necessary, up to an infinite number. Additionally, the term "having" as used herein in both the disclosure and claims, is utilized in an open-ended manner.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the term "include," "have," or the like is used in the description or the claims, such term is intended to be inclusive in a manner similar to the term "comprise" as "comprise" is interpreted when employed as a transitional word in a claim. Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. Relational terms such as first and second and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description. No claim element is to be construed under the provisions of 35 U.S.C. § 112, sixth paragraph, unless the element is expressly recited using the phrase "means for" or, in the case of a method claim, the element is recited using the phrase "step for."

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

It will be understood that the present disclosure may be embodied in other specific forms without departing from the spirit or central characteristics thereof. The present examples and embodiments, therefore, are to be considered in all respects as illustrative and not restrictive, and the Claims are not to be limited to the details given herein. Accordingly, while the specific embodiments have been illustrated and described, numerous modifications come to mind without significantly departing from the spirit of the disclosure and the scope of protection is only limited by the scope of the accompanying Claims.

Further, the claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A jogging stroller having a walk mode and a run mode, comprising:

a frame having an upper housing assembly pivotally attached to a lower housing assembly to allow the frame to fold;

the lower housing assembly having a front wheel and two rear wheels, wherein the front wheel is locked in a forward positon in the run mode of the jogging stroller, and wherein the front wheel is able to rotate about a pivot axle in the walk mode of the jogging stroller;

a wheel locking mechanism to lock and unlock the front wheel from rotating about the pivot axle, the wheel locking mechanism comprising a receiver connected to the front wheel, a locking member, a bias member and a cable, wherein the locking member engages the receiver in a locked mode to prevent the front wheel from rotating about the pivot axle, wherein the locking member disengages from the receiver in an unlocked mode to allow the wheel to rotate about the pivot axle, wherein the bias member biases the locking member toward the receiver, and wherein the cable has a first end connected to the locking member;

the upper housing assembly of the frame having a handle and a twist assembly, wherein a second end of the cable is connected to the twist assembly, wherein the twist assembly has a normal position and an actuated position, the twist assembly operating to move the wheel locking mechanism from the locked mode to the unlocked mode when the twist assembly is in the actuated position to allow the front wheel to rotate about the pivot axle in the unlocked mode, and to move the wheel locking mechanism from the unlocked mode to the locked mode when the twist assembly is in the normal position to lock the front wheel in the forward position; and, a handle locking mechanism to operably lock the twist assembly and the wheel locking mechanism in one of the walk mode and the run mode, and to operably lock the twist assembly and the wheel locking mechanism in the other of the walk mode and the run mode, and wherein the user can temporarily move the twist assembly to the actuated position when the handle locking mechanism is in the run mode to allow the front wheel to rotate about the pivot axis until the twist assembly is returned to the normal position.

2. The jogging stroller of claim 1, wherein the front wheel is a caster wheel having a wheel shaft positioned behind a pivot axle of the front wheel.

3. The jogging stroller of claim 1, wherein the receiver has an opening, and wherein the locking member has a finger that is inserted into the opening in the receiver when the locking mechanism is in the locked mode.

4. The jogging stroller of claim 1, wherein the handle locking mechanism comprises a locking collar adjacent the twist assembly.

5. The jogging stroller of claim 4, wherein the locking collar moves from a locked mode to an unlocked mode, and wherein the locking collar stays in the locked mode until moved by the user to the unlocked mode.

6. The jogging stroller of claim 1, wherein the cable extends from the wheel locking mechanism to the twist assembly.

7. The jogging stroller of claim 1, further comprising a bias member in the twist assembly to bias the twist assembly to the normal position.

8. The jogging stroller of claim 1, further comprising a cam follower within the twist assembly, the cam follower moving axially upon rotational movement of the twist assembly.

9. The jogging stroller of claim 8, wherein the second end of the cable is connected to the cam follower.

10. A jogging stroller having a walk mode and a run mode, comprising:

a frame;

a front wheel and two rear wheels attached to the frame, wherein the front wheel is locked in a forward positon in the run mode of the jogging stroller, and wherein the front wheel is able to rotate about a pivot axle in the walk mode of the jogging stroller;

a wheel locking mechanism to lock and unlock the front wheel from rotating about the pivot axle, the wheel locking mechanism comprising a receiver connected to the front wheel, a locking member that engages the receiver in a locked mode and that disengages from the receiver in an unlocked mode, a bias member to bias the locking member toward the receiver, and a cable, wherein the cable has a first end connected to the locking member; and, a handle connected to the frame, the handle having a twist assembly, wherein a second end of the cable is connected to the twist assembly, wherein the twist assembly has a normal position and an actuated position, the twist assembly operating to move the wheel locking mechanism from the locked mode to the unlocked mode when the twist assembly is in the actuated position to allow the front wheel to rotate about the pivot axle in the unlocked mode, and to move the wheel locking mechanism from the unlocked mode to the locked mode when the twist assembly is in the normal position to lock the front wheel in the forward position.

11. The jogging stroller of claim 10, wherein the frame comprises an upper housing assembly pivotally attached to a lower housing assembly to allow the frame to fold.

12. The jogging stroller of claim 10, wherein the front wheel is a caster wheel having a wheel shaft positioned behind a pivot axle of the front wheel.

13. The jogging stroller of claim 10, further comprising a handle locking mechanism to operably lock the twist assembly and the wheel locking mechanism in one of the walk mode and the run mode, and to operably lock the twist assembly and the wheel locking mechanism in the other of the walk mode and the run mode, and wherein the user can temporarily move the twist assembly to the actuated position when the handle locking mechanism is in the run mode to allow the front wheel to rotate about the pivot axis until the twist assembly is returned to the normal position.

14. The jogging stroller of claim 13, wherein the handle locking mechanism comprises a locking collar adjacent the twist assembly.

15. The jogging stroller of claim 14, wherein the locking collar moves from a locked mode to an unlocked mode, and wherein the locking collar stays in the locked mode until moved by the user to the unlocked mode.

16. A jogging stroller having a walk mode and a run mode, comprising:

a frame having an upper housing assembly pivotally attached to a lower housing assembly to allow the frame to fold;

a front wheel and two rear wheels attached to the lower housing assembly of the frame, wherein the front wheel is locked in a forward positon in the run mode of the jogging stroller, and wherein the front wheel is able to rotate about a pivot axle in the walk mode of the jogging stroller;

a wheel locking mechanism to lock and unlock the front wheel from rotating about the pivot axle, the wheel locking mechanism comprising a receiver connected to the front wheel, a locking member that engages the receiver in a locked mode and that disengages from the receiver in an unlocked mode, a bias member to bias the locking member toward the receiver, and a cable, wherein the cable has a first end connected to the locking member; and, a handle connected to the frame, the handle having a twist assembly, wherein a second end of the cable is connected to the twist assembly, wherein the twist assembly has a normal position and an actuated position, the twist assembly operating to move the wheel locking mechanism from the locked mode to the unlocked mode when the twist assembly is in the actuated position to allow the front wheel to rotate about the pivot axle in the unlocked mode, and to move the wheel locking mechanism from the unlocked mode to the locked mode when the twist assembly is in the normal position to lock the front wheel in the forward position.

17. The jogging stroller of claim 16, wherein the front wheel is a caster wheel having a wheel shaft positioned behind a pivot axle of the front wheel.

18. The jogging stroller of claim 16, further comprising a handle locking mechanism to operably lock the twist assembly and the wheel locking mechanism in one of the walk mode and the run mode, and to operably lock the twist assembly and the wheel locking mechanism in the other of the walk mode and the run mode, and wherein the user can temporarily move the twist assembly to the actuated position when the handle locking mechanism is in the run mode to allow the front wheel to rotate about the pivot axis until the twist assembly is returned to the normal position.

19. The jogging stroller of claim 18, wherein the handle locking mechanism comprises a locking collar adjacent the twist assembly, wherein the locking collar moves from a locked mode to an unlocked mode, and wherein the locking collar stays in the locked mode until moved by the user to the unlocked mode.

20. The jogging stroller of claim 16, further comprising a bias member in the twist assembly to bias the twist assembly to the normal position.

* * * * *